(12) United States Patent
Lough

(10) Patent No.: US 6,666,904 B1
(45) Date of Patent: *Dec. 23, 2003

(54) METHOD AND SYSTEM FOR EXTRACTING METAL FROM GLASS WASTE

(75) Inventor: Larry Lee Lough, Springdale, OH (US)

(73) Assignee: Tri E Holding, LLC, Fairfield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/310,411

(22) Filed: Dec. 5, 2002

(51) Int. Cl.[7] ................................................. C22B 3/06
(52) U.S. Cl. ........................................................ 75/743
(58) Field of Search ........................................... 75/743

(56) References Cited

U.S. PATENT DOCUMENTS

| | | | | |
|---|---|---|---|---|
| 5,350,121 A | * | 9/1994 | Vitunac et al. ............... | 241/14 |
| 5,997,718 A | | 12/1999 | Goozner et al. ............ | 205/560 |
| 6,129,779 A | * | 10/2000 | Bohland et al. .............. | 75/714 |

* cited by examiner

Primary Examiner—Melvyn Andrews
(74) Attorney, Agent, or Firm—Schwegman, Lundberg, Woessner & Kluth, P.A.

(57) ABSTRACT

A method and systems are provided for extracting heavy metal from glass waste. Glass is initially crushed to a diameter size of about 2 millimeters. The glass is then added to a tank having a solution of water and acid, where the acid removes metal from the surface of the glass particles. The solution is then separated from the glass particles. In some embodiments, the glass particles are also rinsed with water and the rinsed water is treated to remove any residual contaminates. In more embodiments, the solution can be reused for a number of iterations that treat glass waste in order to extract heavy metal from the glass waste.

20 Claims, 3 Drawing Sheets

US 6,666,904 B1

METHOD AND SYSTEM FOR EXTRACTING METAL FROM GLASS WASTE

FIELD OF THE INVENTION

The present invention is related to treatment of glass waste products, and more specifically to a method and systems for extracting heavy metals from glass waste.

BACKGROUND OF THE INVENTION

Efficient and environmentally safe techniques to recycle and dispose of glass waste still eludes the waste disposal and recycling industries. If glass waste is not safely disposed of, then the lead (or other heavy metals) included within the glass waste will leach into a community's water supply. The levels of lead within the drinking water will then exceed was is typically considered safe (5 parts per million (ppm)) and people consuming the water will then begin to experience illness and possible death.

Moreover, recycling glass is manually intensive and expensive. This is so because one vendor of glass may use different concentrations of lead in their glass products than another glass vendor. As a result, in order to recycle the glass waste, the waste must be separated into vendor specific categories so that each vendor receives glass waste that can be reused by them. Glass waste with different concentrations of lead will melt, spread, and solidify at different temperatures, and therefore glass vendors can only reuse glass waste that has the proper amount of lead concentrations that is used in their glass manufacturing process. Waste disposal facilities receive glass waste that is not separated by vendor, and the waste disposal facilities have no effective techniques for automatically separating different glass vending wastes from one another.

Because of the expense and time consuming nature associated with recycling glass waste, many waste disposal facilities have resorted to illegal disposal of glass waste. This is where the glass waste is not properly treated according to state and federal Environmental Protection Agencies (EPAs). This is extremely dangerous to the people that live near any such facility.

Glass waste associated with computer monitors, such as Cathode Ray Tube (CRT) monitors, and television sets are particular troublesome for glass recyclers and waste disposal facilities, because these monitors include high levels of lead. In the past, one solution has been to ship these monitors to other countries for disposal, such as China. However, in recent years these third-world or developing countries have started to refuse these monitors because of the health hazards this waste has created for their citizens.

Presently, the most popular and legal technique for disposing of computer monitors is a smelting technique. A smelting process melts the glass of the monitor at an extremely high temperature and then extracts the lead off the top of the liquid produced. However, the EPA has authorized this process only as a stop gap measure since no other viable technique presently exist to safely dispose of monitor glass. The reason why the EPA has only temporarily authorized this processes is because the process produces toxic gas as a byproduct and cross contaminates the glass with other toxins. Some toxins and other heavy metals produced by the smelting process include Selenium arsenic. Therefore, the EPA realizes that it cannot continue to permit the smelting process to continue indefinitely and is actively pursuing and promoting research to replace the process.

CRT disposal or television disposal is a major environmental challenge for the United States, this challenge continues to escalate as more and more organizations and people continue to buy and dispose of CRT monitors and televisions at alarming rates. The EPA has only authorized two methods of disposal for these monitors; the first is to recycle the monitors by separating glass waste into the appropriate manufacturers associated with the waste (glass-to-glass recycling). The second technique is the smelting process, which the EPA has only approved as a stopgap or emergency measure. Currently, CRT waste is the number two contributor to hazardous lead waste in the United States. This problem will only continue to grow over the next several years as liquid crystal and/or plasma screen technology is integrated into the industry and individuals/organizations accelerate their disposal rates of the CRT monitors.

Accordingly, there is a need for improved techniques to extract heavy metals from glass waste products. The techniques should be environmentally safe, efficient, and practical so that the techniques are readily embraced and adopted by waste disposal facilities.

SUMMARY OF THE INVENTION

Briefly and in general terms, a method and systems are provided for extracting heavy metals from glass waste products. The glass waste is crushed to a small size and treated with a solution of water and acid. The acid extracts the heavy metals from the surface of the glass waste. The glass particles and solution are then separated.

More specifically, and in one embodiment, a method to extract metal from glass is presented. Glass is crushed into glass particles. The glass particles having a size of less than about 2 millimeters in diameter are filtered out from the glass particles of larger diameter size. The tank is filled with the filtered glass particles and a solution of water ($H_2O$) and Nitric acid ($HNO_3$). Furthermore, the solution and glass particles are circulated within the tank for a first period of time. Next, the solution is removed from the tank.

In still another embodiment, a system for extracting metal from glass is described. The system includes a grinding device, a screen, a conveyor, a circulating pump, and a solution pumping device. The grinding device crushes glass into glass particles. The screen filters glass particles having a size of about 2 millimeters. Moreover, the conveyor transports the filtered glass to a tank having a solution of water ($H_2O$) and Nitric Acid ($HNO_3$). The circulating pump device circulates the filtered glass particles and the solution for a first period of time. Finally, the solution-pumping device pumps the solution out of the tank.

In yet another embodiment, a system for extracting metal from glass is provided. The system includes a conveyor device, a solution pump, and a separating device. The conveyor device transports glass particles having a size of about 2 millimeters to a processing tank. The solution pump fills the processing tank with a solution of water and acid, where the acid removes lead from the surface of the glass particles. Furthermore, the separating device removes the glass particles from the tank and the solution.

Still other aspects of the present invention will become apparent to those of ordinary skill in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

In the following description and the drawings illustrate specific embodiments of the invention sufficiently to enable those of ordinary skill in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents. The following description is, therefore, not to be taken in a limited sense, and the scope of the present invention is defined by the appended claims.

In various embodiments of the present invention, various devices, for grinding, separating, holding and moving particles or waste are used. These devices are well known to one of ordinary skill in the art and are readily available and modifiable by one of ordinary skill in the art to achieve the tenets of the present disclosure. Accordingly, when these devices are assembled and/or modified to achieve the teachings of various embodiments of the present invention, the assembled or modified system is intended to fall within the broad scope of the present disclosure.

Figure 1:
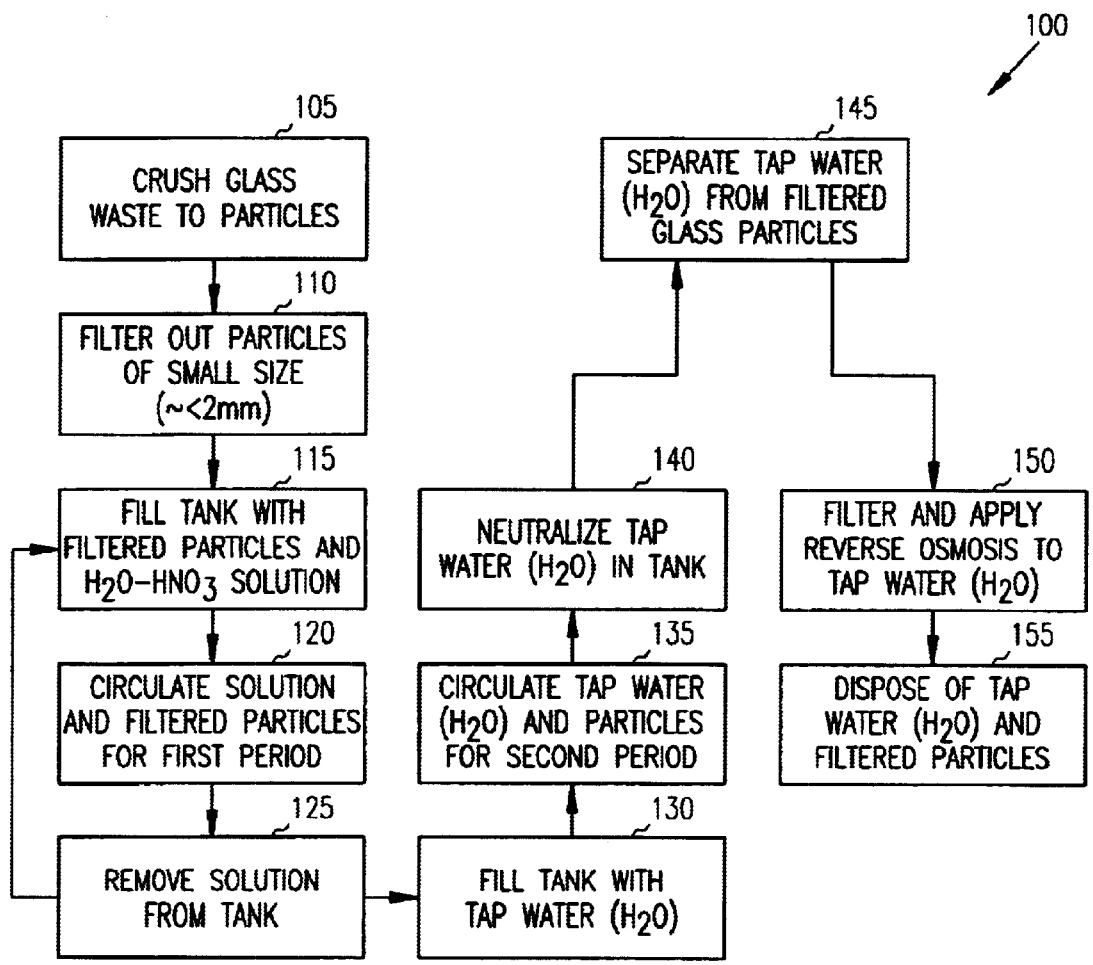
FIG. 1 is a flowchart of a method for extracting metal from glass, according to one embodiment of the present invention.

FIG. 1 illustrates a flowchart of one method 100 for extracting metal from glass, according to one embodiment of the present invention. The method 100 is achieved through the use of standard waste disposal equipment or devices. The method 100 can also be processed in any custom made equipment designed to process method 100.

As has been discussed in detail above, glass waste, particularly glass waste associated with CRT monitors or televisions, includes unacceptable levels of lead, or other heavy metals (e.g., cadmium, mercury, selenium, arsenic, and the like), that needs to be removed or decreased to acceptable levels before the glass waste can be disposed of in a landfill. Moreover, since glass waste includes varying levels of lead or other heavy metals recycling is not a practical solution because the glass waste must be separated by glass manufacture to be of any recycling use. With the present disclosure glass waste can economically and safely be disposed of well within the current EPA standards by safely and efficiently removing lead and other heavy metals from the glass waste.

At 105, the glass waste is provided to a grinding device. In some embodiments, the glass waste is fed to the grinding device by a variable speed screw conveyor made of stainless steel material. In one embodiment, the grinding device is a high-speed hammer mill, such as the high-speed hammer mill manufactured by Andela Tool of Richfield Springs, N.Y. The grinding device reduces the size of the glass waste by approximately 55% per pass through the grinding device.

As the glass leaves a grinding chamber of the grinding device, a trommel separation device classifies the glass particles into particles of glass that are less than about 2 millimeters (mm) in diameter and those that are larger than 2 mm in diameter. Particles having diameters of about 2 mm or less are allowed to pass through a screen onto a conveyor device, such as a screw conveyor of stainless steel construction. Thus, at 110, glass particles of about 2 mm in diameter or less are filtered out of the supply of glass waste. Particles that are larger are reintroduced to the grinding device through a feedstock for continued grinding until all glass particles have achieved a diameter of about 2 mm or less and are filtered onto the conveyor device.

The filtered glass particles are transported on the conveyor device to a chemical processing tank. The chemical processing tank is filled with the filtered glass particles until approximately 75% of the tank is filled with the filtered glass particles. Next, a solution of acid and water is added to the tank to completely fill the tank at 115. The acid solution is approximately 14% Nitric acid ($HNO_3$) and 86% tap water ($H_2O$). Due to the small size of the filtered glass particles and the acid solution, the mixture in the tank makes a slurry mixture. In some embodiments, a different acid other than Nitric Acid ($HNO_3$) can be used, such as Hydrochloric acid (HCL), Phosphoric acid ($H_3PO_4$), or the like. Moreover, different concentrations of acid to water can be used without departing from the present disclosure.

At 120, the slurry mixture is then circulated for a first period of time within the tank by use of a tank pump. In one embodiment, the tank pump is a laminar flow pump that circulates the slurry at a rate of approximately 100 gallons per minute (gpm). The first period is about at least 2 hours in duration. In one embodiment, the first period is approximately 6 hours in duration. Upon conclusion of the circulating or mixing cycle, the acid solution is removed from the tank at 125.

In one embodiment, the filtered glass particles are then subjected to a wash cycle starting at 130, where regular tap water is pumped into the tank. The tap water and filtered glass particle mixture is the circulated within the tank for a second period of time at 135. In one embodiment, the second period of time is about 1 hour in duration. Lime is then injected into the mixture to neutralize its acidity at 140. In one embodiment, about 10% lime is injected for 90% water.

At 145, the mixture is then separated such that the neutralized tap water is separated from the filtered glass particles. In one embodiment, this separation occurs by diverting the filtered glass particles to a vorta sieve via a screw conveyor for final storage. At 150, the remaining water effluent is diverted to a bag filter to remove any suspended solids and than through a combination charcoal filter and reverse osmosis filter in order to remove any residual soluble lead or other heavy metals. At 155, the tap water and the filtered glass particles can be safely disposed of in an environmentally safe manner.

In various embodiments of the present invention, the acid solution can be reused with another cycle of glass treatment. In fact, the acid solution can be reused with more than 50 cycles, depending upon the heavy metal content of the acid solution. The tap water used for rinsing or washing the filtered glass particles is safe to dispose of in any municipality's water supply and conforms to all EPA regulations. When the acid solution has reached its useful life it can be treated as an ordinary hazardous waste stream and disposed of according to EPA regulations.

Moreover, the filtered and treated glass particles have heavy metals removed from their surface and any lead (or other heavy metals) remaining in the particles cannot be released because the force required to further break the glass particles of about less than 2 mm far exceeds any force that may be applied in a landfill or if the glass particles are used as a sand mixture for blacktop or concrete. In fact, any force will be dispersed throughout the particles and will not be concentrated in any specific single glass particle. As a result, the filtered and treated glass particles far exceed existing EPA regulations and can be disposed of or used in other products without environmental concern that the particles will rupture or expose the environment to lead or other heavy metals.

Furthermore, when the glass particles are circulated with the acid solution and then again, in some embodiments, with the tap water the glass particles become smooth removing any jagged edges. In fact the glass particles form the texture and appearance of typical sand.

Although various embodiments above discuss removing the acid solution and washing the glass particles, one of ordinary skill in the art readily appreciates that a variety of configurations of these steps can be used that still conform to the teachings of the present invention. For instance, the acid solution can remain in the tank with the glass particles filtered and transported to another tank for rinsing, or the glass particles can be rinsed as they are transported to a final destination. All such variations on the steps of method 100 are intended to fall within the broad scope of the present invention.

Figure 2:
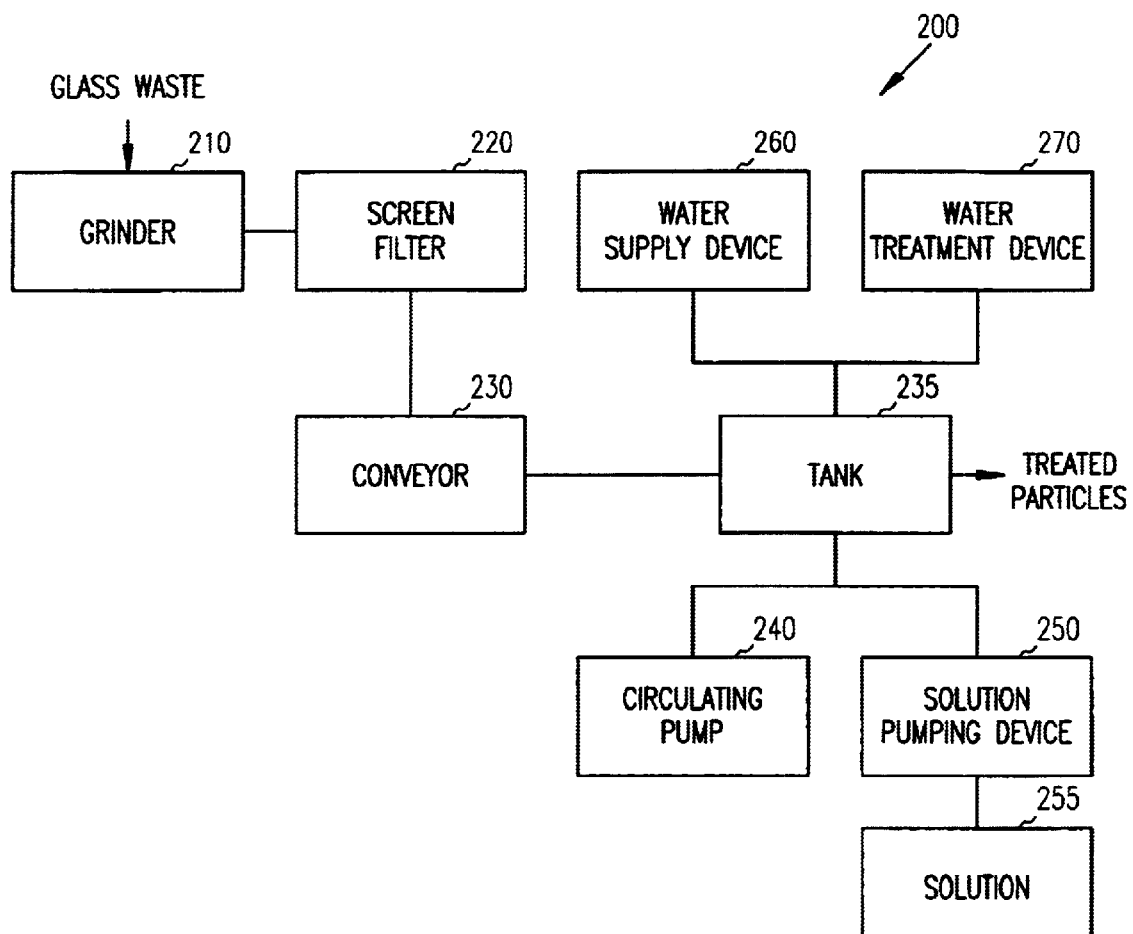
FIG. 2 is a diagram of a system for extracting metal from glass, according to one embodiment of the present invention.

FIG. 2 illustrates a diagram of one system 200 for extracting heavy metals from glass, according to one embodiment of the present invention. The metal extraction system 200 includes a grinding device 210, a screen filter 220, a conveyor 230, a circulating pump device 240, and a solution-pumping device 250. The configuration of the various components of the metal extraction system 200 are presented for purposes of illustration only and are not intended to limit the present invention, since a variety of additional components and configurations can be used to achieve the teachings of the present invention. Thus, all such additional components and configurations fall within the scope of the present invention. Moreover, the components are well known and readily available to those of ordinary skill in the art.

The grinding or crushing device 210 grinds glass waste into small particles. One such grinding device 210 that can be used is a high-speed hammer mill, such as one manufactured by Andela Tool Inc., of Richfield, N. Y. The glass waste can be a CRT monitor and a magnetic device can be applied to the feeding end of the grinding device 210 to extract metal waste material from the glass waste. When the glass particles have a diameter size less than about 2 mm they fall through a screen filter 220 onto a conveyor device. The glass particles having a diameter of greater than about 2 mm are resent to the grinding device 210 until all the glass waste has been crushed to a diameter size of less than about 2 mm. The screen filter 220 can be associated with a trommel separation device an exit end of the grinding device 210.

The conveyor device 230 transports the filtered glass particles to a chemical treatment tank 235. In one embodiment, the conveyor device 230 is a screw conveyor of stainless steel construction. The conveyor device 230 continues to deposit the filtered glass particles into the tank 235 until a desired level or weight is achieved within the tank 235. In one embodiment, the conveyor device 230 continues to deposit the filtered glass particles into the tank 235 until the tank is approximately 75% full of filtered glass particles.

Next, an acid water solution 255 is pumped into the tank 235 to fill the tank 235 to capacity with the filtered glass particles and the added acid solution 255. In one embodiment, the solution 255 is approximately 86% water ($H_2O$) and 14% Nitric acid ($HNO_3$). In other embodiments, the acid used can be Hydrochloric acid (HCL), Phosphoric acid ($H_3PO_4$), or other acids. Moreover, the concentrations of acid to water can be altered without departing from the present disclosure. A solution-pumping device 250 is used to supply and remove the solution 255.

Once the tank is full of the acid solution 255 and the filtered glass particles, the slurry mixture is mixed within the tank 235 for a first period of time by using a circulating pump device 240, such as a laminar flow pump adapted to the bottom of the tank 235. The circulating pump device 240 circulates the slurry mixture at a rate of approximately 100 gpm. The first period of time during which the slurry mixture is mixed or circulated within the tank 235 is a duration having a range of approximately 2 to 6 hours.

After the first period of time expires, the circulating pump device 240 is shut down and the solution 255 is removed from the tank 235 using the solution-pumping device 250, or any other device designed to remove the solution 255. The solution 255 is then stored in its original holding tank (not depicted in FIG. 2) and be reused for a plurality of additional treatment cycles on additional glass waste. The solution 255 can be reused for approximately 50 iterations (depending upon the concentration levels of the heavy metal in the solution 255) of treatment cycles.

Once the solution 255 is removed from the tank 235, the tank 235, in one embodiment, is filled with regular tap water to wash or rinse the filtered glass particles of any acidic residue left by the solution 255. The tap water is supplied to the tank 235 through a water supply device 260. Moreover, the tap water is supplied until the tank 235 is completely full. The water and filtered glass particles are then circulated within the tank 235 for a second period of time. In one embodiment, the second period of time is about 1 hour.

After the expiration of the second period of time, the circulating pump device 240 is shut down. Next, in one embodiment, lime is supplied to the water and filtered glass particle mixture to neutralize the acidity. In one embodiment, this is achieved by adding 10% lime for 90% tap water. The neutralized water and lime mixture is then pumped to a filter separator with the filtered glass particles diverted (e.g., via a vorta sieve, and the like) onto a screw conveyor for final storage. Of course as one or ordinary skill in the art readily appreciates, other neutralizing or precipitation agents can be used other than lime. All such agents are intended to fall within the broad scope of the present invention.

At this point, the glass particles do not have heavy metals on their surface due to the mixing cycles with the solution 255 and the tap water. Moreover, any heavy metal remaining within the filtered glass particles cannot be extracted from the filtered glass particles without a substantial and focused force directed on a single glass particle. As a practical matter conventional landfill processes will not achieve this force. Moreover, other products, such as road materials and others, can use the filtered glass particles with assurance that no exerted force that the products are subjected to will be enough to crack the filtered glass particles and release enough lead or other heavy metal (e.g., cadmium, mercury, arsenic, selenium, and others) to be considered hazardous by the EPA.

The neutralized water can then be supplied to a water treatment device 270 to make the water safe for disposal in a municipality's water supply. In one embodiment, the water treatment device 270 is a carbon filtering system combined with a reverse osmosis filtering system. After treatment, the water can be safely discharged to a sewage system of a municipality.

One of ordinary skill in the art, now appreciates how glass waste, particularly waste associated with CRT monitor disposal, can be efficiently and environmentally safely treated and disposed of with the teachings of the present invention. These techniques adhere to and exceed EPA regulations and provide a mechanism for waste disposal facilities to economically dispose of glass waste. Moreover, the treated glass particles have the consistency of sand, since the circulating cycles have smoothed the edges of the very small glass particles. Moreover, further processing can produce spherical particles. In fact, the glass particles are no more harmful than sand would be if ingested or if they were to enter an open wound. Therefore, the glass particles can be used in a plurality of other products such as foundations for roads, mixtures for concrete, and others.

Although various devices were depicted for purposes of illustration with respect to various embodiments of FIG. 2, the present invention is not intended to be so limited. In fact, devices now known or hereafter developed which are designed to achieve the tenets of the present invention where glass is crushed to small particles and then treated with an acid solution are intended to fall within the scope of the present invention.

Figure 3:
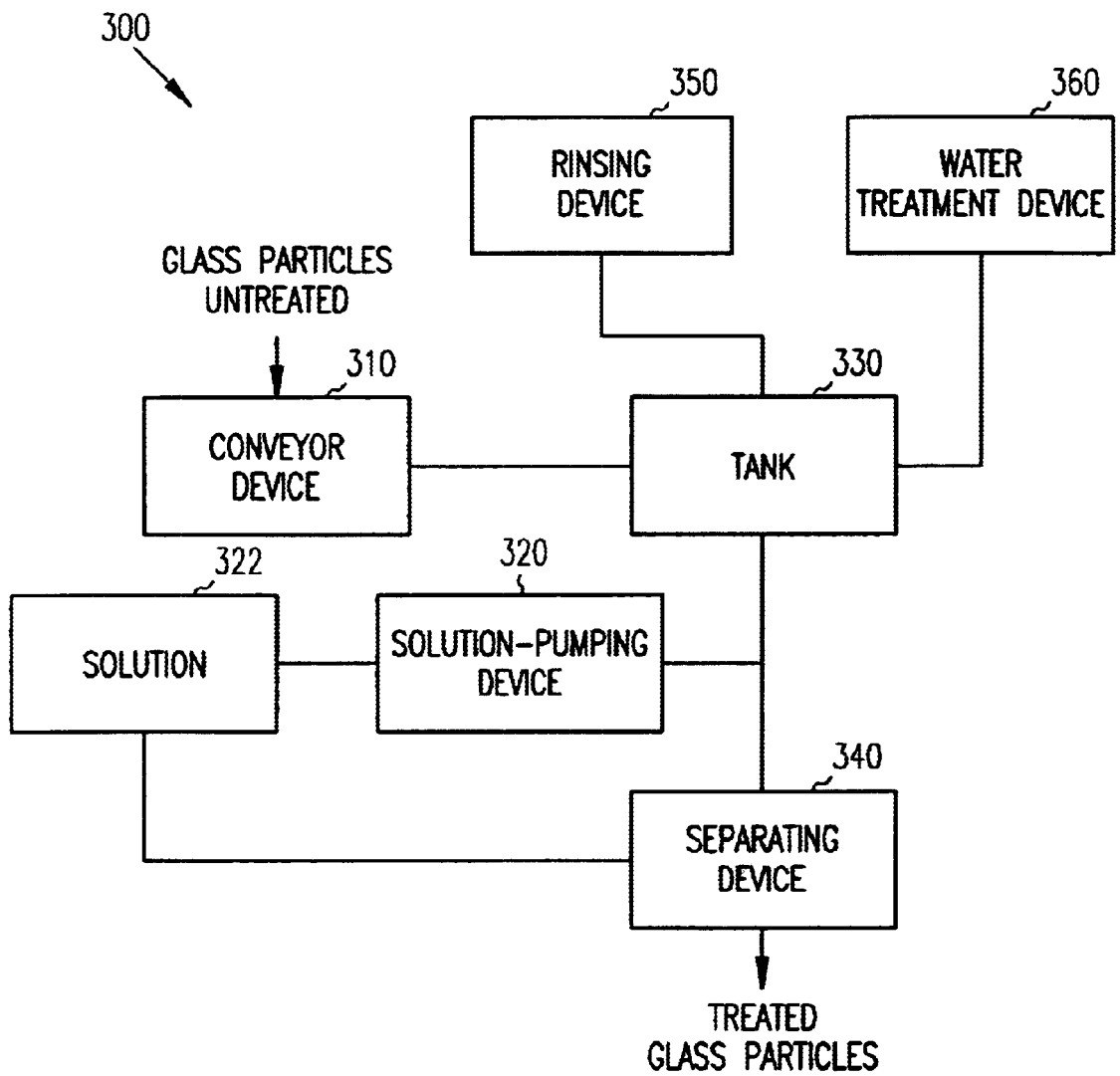
FIG. 3 is a diagram of another system for extracting metal from glass, according to one embodiment of the present invention.

FIG. 3 illustrates a diagram of another system 300 for extracting heavy metals from glass, according to one embodiment of the present invention. The metal extraction system 300 includes a conveyor device 310, a solution-pumping device 320, and a separating device 330. Untreated glass particles having a diameter of less than about 2 mm are deposited onto the conveyor device 310. Any technique of grinding/crushing device can be used to originally deposit the glass particles onto the conveyor device 310.

The conveyor device 310, in one embodiment, is a screw conveyor of stainless steel construction. The conveyor device 310 deposits the glass particles into a processing tank 330 until a desired level or weight is reached within the tank 330. In one embodiment, the conveyor device 310 is configured to halt depositing glass particles into the tank 330 when the tank 330 is about 75% filled with the glass particles.

Next, the solution pumping device 320 pumps an acidic solution of acid and water mixture 322 into the tank 330 to bring the tank 330 to a full capacity level. In one embodiment, the acid solution 322 is a mixture of water ($H_2O$) and Nitric acid ($HNO_3$). In other embodiments, the acid can be Hydrochloric acid (HCL), Phosphoric acid ($H_3PO_4$), or other acids. Moreover, in one embodiment, the concentration of $HNO_3$ to water within the acidic solution is approximately 14%. Of course as one of ordinary skill in the art appreciates, other concentrations of $HNO_3$ can be used and different acids can be used without departing from the present invention.

In one embodiment, the acidic solution 322 and the glass particles are mixed or circulated within the tank 330 for a first period of time. Mixing can occur with a solution-circulating device, such as a laminar flow pump where the mixture is circulated at a rate of approximately 100 gpm. The circulation rate and the first period of time are configurable settings that can be adjusted without departing from the present invention. In one embodiment, the first period of time is a range between 2 to 6 hours.

When the first period of time has expired, the solution 322 is removed from the tank 330 via a separation device 340, such as a screen filter and the like. The solution 322 can then be returned to its original holding tank and reused for a number of different treatment cycles. In one embodiment, the solution 322 is reused for approximately 53 treatment cycles on new untreated glass particles.

Next, a rinsing device 350 supplies ordinary tap water to the tank 330 having the glass particles where the glass particles and tap water are circulated within the tank for a second period of time that is also configurable. In one embodiment, the second period of time is about 1 hour in duration. After, the second period of time elapses the water can be brought to the appropriate pH level by injecting lime (or other neutralizing or precipitation agents) into the water. Once the proper pH level is reached for tap water, the separating device 340 separates the glass particles and water, and the glass is now safe to use with other products or to be disposed of in an environmentally safe and approved manner.

Furthermore, in one embodiment, the tap water used for rinsing is subjected to a water treatment device 360, such as a carbon filtering process and/or a reverse osmosis process. Upon the conclusion of this treatment, the water is safe to dispose of in the sewage of a municipality's water supply.

Existing techniques for glass disposal are not practical, especially for CRT monitor or television disposal. Currently, only separation of each vendor's glass is acceptable for recycling and this is not easily achieved and it is not automated. The only other EPA approved solution involves a smelter process were the materials are melted at high temperature. This process is approved by the EPA only as a stopgap/emergency measure and has introduced additional pollutants into the environment. Moreover, the process is complicated and expensive to deploy. Yet, the techniques, methods, and systems of the present disclosure present economical and environmentally safe alternatives to disposing of glass waste and safely reusing glass waste in other products. This is achieved with existing equipment known and available to those of ordinary skill in the art.

Although specific embodiments have been illustrated and described herein, those of ordinary skill in the art will appreciate that any arrangement calculated to achieve the same purpose can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

What is claimed is:

1. A method to extract heavy metals from glass waste, comprising:

crushing glass waste into glass particles;
filtering out a number of the glass particles that are less than or equal to 2 millimeters in diameter size and re-crushing a number of the glass particles that are greater than 2 millimeters in diameter size until the glass particles are filtered glass particles that are less than or equal to 2 millimeters in diameter size;
filling a tank with the filtered glass particles, wherein the tank includes a solution of water ($H_2O$) and Nitric acid ($HNO_3$), wherein the filtered glass particles and the solution form a slurry;
circulating the slurry for a first period of time, wherein heavy metals that were originally associated with the filtered glass particles are extracted from the filtered glass particles and mixed with the solution portion of the slurry producing a mixture having treated glass particles and a modified solution that has the extracted heavy metals;
removing the mixture from the tank; and separating the treated glass particles and the modified solution from the mixture.

2. The method of claim 1 further comprising:

filling the tank with tap water ($H_2O$) and the treated glass particles; and circulating the treated glass particles and the tap water for a second period of time producing a water effluent and rinsed glass particles.

3. The method of claim 2 further comprising:

removing the rinsed glass particles from the tank;

testing a potential Hydrogen (pH) level for the water affluent;

treating the water effluent to produce waste water that is environmentally safe for disposal in a municipal water supply.

4. The method of claim 2 wherein in circulating, the second period of time is 1 hour.

5. The method of claim 1 further comprising, reusing the modified solution to process the method for two or more additional iterations for additional glass waste.

6. The method of claim 1 wherein in filling the tank, the solution includes about 14% Nitric Acid ($HNO_3$) and about 86% tap water ($H_2O$).

7. The method of claim 1 wherein in circulating, the first period of time is in the range of 2 to 6 hours.

8. A method to extract heavy metals from glass waste, comprising:

crushing glass waste into glass particles having diameter sizes of less than or equal to 2 millimeters;
mixing the glass particles in an acid solution to form a slurry;
circulating the slurry for a first period of time, thereby extracting heavy metals from the glass particles producing treated glass particles and mixing the extracted heavy metals with the acid solution producing an acid mixture; and
separating the treated glass particles and the acid mixture from the slurry.

9. The method of claim 8 wherein the mixing further includes filling a tank with the glass particles and the acid solution.

10. The method of claim 9 further comprising pumping out of the tank the acid mixture during the separating.

11. The method of claim 10 further comprising:

filling the tank with tap water; and circulating the treated glass particles and the tap water with one another within the tank for a second period of time producing rinsed and treated glass particles and acidic water.

12. The method of claim 11 further comprising removing the rinsed and treated glass articles from the tank.

13. The method of claim 12 further comprising treating the acidic water within the tank to produce waste water that is environmentally safe for disposal.

14. The method of claim 8 wherein in crushing the glass waste, the glass waste is Cathode Ray Tube (CRT) glass waste.

15. The method of claim 8 wherein in mixing, the acidic solution includes tap water and at least one acid of Nitric Acid ($HNO_3$), Hydrochloric acid (HCL), and Phosphoric acid ($H_3PO_4$).

16. The method of claim 8 wherein in circulating, the heavy metals include at least one of lead, cadmium, mercury, selenium, and arsenic.

17. A method to extract heavy metals from glass waste, comprising:

crushing glass waste into glass particles having diameter sizes of 2 millimeters or less;

creating a slurry that includes the glass particles and an acid solution;

circulating the slurry thereby extracting heavy metals from the glass particles producing treated glass particles and an acid mixture, the acid mixture having the extracted heavy metals; and separating the treated glass particles and the acid mixture from one another.

18. The method of claim 17 further comprising rinsing the treated glass particles with tap water producing rinsed and treated glass particles.

19. The method of claim 17 further comprising circulating the treated glass particles with tap water for a period of time producing rinsed and treated glass particles and acidic water.

20. The method of claim 19 further comprising:

disposing of the rinsed and treated glass particles in a landfill;

treating the acidic water to produce waste water; and disposing of the waste water in a municipal water supply.

* * * * *